United States Patent
Matsumura et al.

(10) Patent No.: US 9,525,635 B2
(45) Date of Patent: Dec. 20, 2016

(54) NETWORK COMMUNICATION APPARATUS AND METHOD OF PREFERENTIAL BAND LIMITATION OF TRANSFER FRAME

(71) Applicants: Shihomi Matsumura, Tokyo (JP); Masanori Takashima, Tokyo (JP); Yoji Suzuki, Tokyo (JP)

(72) Inventors: Shihomi Matsumura, Tokyo (JP); Masanori Takashima, Tokyo (JP); Yoji Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/357,746

(22) PCT Filed: Nov. 15, 2012

(86) PCT No.: PCT/JP2012/079705
§ 371 (c)(1),
(2) Date: May 12, 2014

(87) PCT Pub. No.: WO2013/073639
PCT Pub. Date: May 23, 2013

(65) Prior Publication Data
US 2015/0063116 A1  Mar. 5, 2015

(30) Foreign Application Priority Data
Nov. 15, 2011 (JP) ................. 2011-250191

(51) Int. Cl.
*H04L 12/819* (2013.01)
*H04L 12/823* (2013.01)
*H04L 12/851* (2013.01)

(52) U.S. Cl.
CPC ............. *H04L 47/215* (2013.01); *H04L 47/24* (2013.01); *H04L 47/32* (2013.01); *H04L 47/2408* (2013.01)

(58) Field of Classification Search
CPC ............... H04L 47/215; H04L 47/24–47/2408; H04L 47/32
See application file for complete search history.

(56) References Cited

U.S. PATENT DOCUMENTS 8,032,653 B1 * 10/2011 Liu ........................ H04L 47/10
                                                                 370/235.1
8,730,812 B2 * 5/2014 Figueira .................. H04L 47/20
                                                                 370/230
(Continued)

FOREIGN PATENT DOCUMENTS

CN       101064672 A     10/2007
JP       2005-244417 A    9/2005
(Continued)

OTHER PUBLICATIONS

Extended European Search Report dated Apr. 2, 2015.
(Continued)

*Primary Examiner* — Xavier Szewai Wong
(74) *Attorney, Agent, or Firm* — McGinn IP Law Group, PLLC

(57) ABSTRACT

In a network communication apparatus, transfer and discard processing is realized for each transfer frame having a priority, and a band limitation is carried out to prevent the congestion of a transfer destination apparatus. Specifically, a bucket is provided for every priority, and tokens of an amount determined based on the priority are supplemented. Moreover, before a bucket evaluation, one shared bucket is provided. All of the tokens existing in the bucket provided for every priority are transferred to the shared bucket for every constant period. The tokens overflowing beyond a capacity of the shared bucket are discarded. All of the frames are equally evaluated and transferred regardless of the priority of each of the frames, as far as the token exists in the shared bucket. When there is no token in the shared bucket,
(Continued)

switching to the preferential band limitation is carried out and each priority bucket is evaluated. The bucket corresponding to the priority of the frame is checked and when the token exists, transfer processing of the frame is carried out. When there is no token, discard processing of the frame is carried out.

7 Claims, 11 Drawing Sheets

(56) References Cited

U.S. PATENT DOCUMENTS

| | | | |
|---|---|---|---|
| 2004/0090974 A1* | 5/2004 | Balakrishnan | H04L 12/5693 370/412 |
| 2005/0120102 A1* | 6/2005 | Gandhi | H04L 47/10 709/223 |
| 2005/0174944 A1* | 8/2005 | Legault | H04L 47/10 370/235.1 |
| 2006/0193256 A1 | 8/2006 | Burns et al. | |
| 2007/0153682 A1* | 7/2007 | Swenson | H04L 47/10 370/229 |
| 2007/0248014 A1* | 10/2007 | Xie | H04L 47/10 370/235 |
| 2011/0096666 A1* | 4/2011 | Davari | H04L 47/10 370/235 |
| 2014/0119190 A1* | 5/2014 | Yin | H04L 47/215 370/235.1 |

FOREIGN PATENT DOCUMENTS

| | | |
|---|---|---|
| JP | 2007-049591 A | 2/2007 |
| JP | 4704147 B2 | 6/2011 |
| WO | WO 2004/079501 A2 | 9/2004 |
| WO | WO 2011/083682 A1 | 7/2011 |

OTHER PUBLICATIONS

English translation of PCT/ISA/237 (written opinion of the international searching authority, dated Dec. 11, 2012).
PCT/IB/373 dated May 20, 2014.
Chinese Office Action dated Feb. 2, 2016 with an English translation.
International Search Report in PCT/JP2012/079705 dated Dec. 11, 2012 (English Translation Thereof).
OpenFlow Switch Specification,Version 1.0.0,[online], Dec. 31, 2009,[searched on Sep. 8, 2011],Internet (URL:http://www.openflowswitch.org/documents/opeflow-spec-v1.0.0.pdf).
Russian Office Action of corresponding RU Application No. 2014/119522 dated Sep. 10, 2015 with a partial English translation.

* cited by examiner

NETWORK COMMUNICATION APPARATUS AND METHOD OF PREFERENTIAL BAND LIMITATION OF TRANSFER FRAME

TECHNICAL FIELD

The present invention relates to a network communication apparatus, and more particularly relates to a method of preferential band limitation on a transfer frame in a network communication apparatus.

BACKGROUND ART

A conventional network equipment had a problem that a flexible control such as load distribution and a biased state could not be carried out from an external unit. For this reason, when a network scale becomes large, the grasp and improvement of the behavior of a system become difficult, so that an expensive cost is required to change a design and a configuration.

As a technique for solving the above problems, a method of separating a packet transfer function and a route control function of the network equipment is considered. For example, a network equipment is responsible for the packet transfer function, and a control apparatus that is separated externally from the network equipment is responsible for the control function. In this way, the control apparatus can manage the transfer of packets, and a flexible network can be built up.

(Explanation of CD Separation Type Network)

As one of the networks of a centralized management type in which functions are separated, a CD (C: Control Plane/D: Data Plane) separation type network is proposed in which a node apparatus on a data plane side is controlled by a control apparatus on a control plane side.

As one example of the CD separation type network, an open flow network is exemplified which uses an open flow (OpenFlow) technique that a controller controls a switch to carry out a route control in a network. The detail of the OpenFlow technique will be described in Non-Patent Literature 1. Note that the OpenFlow network is merely one example.

(Explanation of OpenFlow Network)

In the OpenFlow network, a series of communications, which are determined based on a combination of a MAC address, an IP address, a port number and the like, are defined as a "flow". A route control, a trouble recovery, a load distribution and an optimization are carried out in units of a flow.

In the OpenFlow network, an open flow controller (OFC: OpenFlow Controller) as a control apparatus operates a flow table with regard to the route control of an open flow switch (OFS: OpenFlow Switch) corresponding to the node apparatus, to control the behavior of the open flow switch.

The controller and the switch are connected to each other through a secure channel that is a communication path protected by a dedicated line or SSL (Secure Socket Layer). The controller and the switch transmit or receive an open flow message (OpenFlow Message) based on an open flow protocol (OpenFlow Protocol) to or from each other, through the secure channel.

The switches in the open flow network includes edge switches and core switches, which form the open flow network and are under the control of the controller. Note that the edge switch is a switch located at a boundary of a network that differs from the open flow network. Also, the core switch is a switch that is used to relay a packet within the open flow network. In the open flow network, the controller can operate the flow table of the switch on a route and control a series of flows from a reception (inflow) of the packets at an input side edge switch (Ingress) to a transmission (outflow) of the packet at an output side edge switch (Egress).

The packet may be also read as a frame. A difference between the packet and the frame is merely a difference of a unit of a data that is handled in a protocol (PDU: Protocol Data Unit). The packet is PDU of "TCP/IP" (Transmission Control Protocol/Internet Protocol). On the other hand, the frame is PDU of "Ethernet (Trademark)".

The flow table is a set of flow entries, each of which defines a combination of a determination condition (rule) to specify packets which are handled as a flow; statistic information which indicates the number of times that the packets comply (match) with the rule; and a processing content (action) that is performed on the packets.

The rule of the flow entry is defined based on various combinations of one or all of data of respective protocol hierarchies included in a head region (field) of the packet, and the rule can be discriminated. As an example of the data of the respective protocol hierarchies, a transmission destination address (Destination Address), a transmission source address (Source Address), a transmission destination port (Destination Port) and a transmission source port (Source Port) and the like are exemplified. Note that the above addresses are assumed to be an MAC address (Media Access Control) or an IP address (Internet Protocol Address). Also, in addition to the above, data of an ingress port (Ingress Port) can be used as the rule of the flow entry. Also, as the rule of the flow entry, it is possible to set a regular expression or a wild card "*" expression of a part (or all) of values of the header region of the packet handled as the flow.

The action of the flow entry indicates the operation in which "a packet is outputted/transferred to a particular port], "a packet is discarded/disposed (deleted)", or "a header of a packet is rewritten". For example, the switch outputs the packet to the port corresponding to an identification data when the action of the flow entry indicates the identification data of an output port (output port number or the like), and the switch discards the packet when the identification data of the output port is not indicated. Or, when the action of the flow entry indicates the header data, the switch rewrites the header of the packet on the basis of the header data.

The switch executes the action of the flow entry for a group of packets (a sequence of packets) that comply with the rule of the flow entry. Specifically, when receiving the packet, the switch searches the flow table for a flow entry, which has the rule complying with the header data of the received packet. As the result of the search, when the flow entry is found that has the rule complying with the header data of the received packet, the switch updates the statistic data of the flow entry and performs an operation, which is specified as the action of the flow entry, on the received packet. On the other hand, as the result of the search, when the flow entry is not found that has the rule complying with the header data of the received packet, the switch determines that the received packet is a first packet, and transfers the received packet (or the copy) through a control channel to the controller in the open flow network, and requests a route calculation of the packet on the basis of the transmission source•transmission destination (address) of the received packet, and receives a message for setting the flow entry as an answer and then updates the flow table.

Note that a default entry, which has the rule complying with the header data of all of the packets in a low priority, has been registered in the flow table. When the flow entry complying with the received packet is not found, the received packet complies with this default entry. The action of the default entry is "the transmission of the inquiry information of the received packet to the controller".

(Subject of Open Flow Network)

Usually, in the open flow network system, the controller and the switches have a connection relation of "1:N (Multiple)" in many cases.

Thus, since there is a case that the controller receives non-controlled requests from many switches, there is a possibility of exceeding a limit of processing performance.

When the controller receives the requests beyond the processing performance and falls in a processing disabled state, each of the switches lost the control function, and the network was disconnected from the respective switches. Thus, there is a necessity that the switch issues the request in consideration of the limit of the processing performance of the controller.

Also, in addition to the protection of the processing performance of the controller, the processing performance of the switch itself was required to be protected.

Thus, in light of both standpoints of the protection of the processing performance of the controller and the protection of the processing performance of the switch, a band limitation between the controller and the switch was required.

However, the band limitation between the controller and the switch is required to be preferentially performed because the object and importance as the open flow function are different depending on a kind of a message.

In a priority control, there was a subject that the frame of a low priority had to be avoided from falling in a non-transfer state.

(Related Technique)

As the related techniques, Patent Literature 1 (JP 2005-244417A) discloses a band control apparatus, a band control method and a band control program. In this related technique, a band limitation processing section stores a remaining token amount X that remains in a token bucket. A token amount monitoring section compares the stored remaining token amount and a maximum burst token amount. A priority control section assigns a communication line capacity, which is assigned to a band insurance type communication on the basis of a comparison result, to a best effort type communication.

Note that the bucket indicates a pail, and it is a container that is abstracted to collect network traffics to be transferred.

CITATION LIST

[Patent Literature 1] JP 2005-244417A
[Non-Patent Literature 1] "OpenFlow Switch Specification, Version 1.0.0", [online], (Dec. 31, 2009), Internet (URL: http://www.openflowswitch.org/documents/openflow-spec-v1.0.0.pdf)

SUMMARY OF THE INVENTION

It is a subject that a priority is assigned to each transfer frame and transfer and discard processing is realized, when a band limitation is carried out to prevent congestion of a transfer destination apparatus in a network communication apparatus.

Also, when a large amount of frames with higher priorities are received, like PQ (Priority Queuing) of a conventional priority control system, a problem that frames of lower priorities are not transferred at all must be solved.

Methods such as WFQ (Weighted Fair Queuing) and CBWFQ (Class-Based Weighted Fair Queuing) for the above-mentioned problems exist. However, because these methods are a method of a preferential transfer control of the frames filled in a plurality of sub queues (sub queues) provided for every priority with the transfer. Because a memory resource is required for the sub queue, there is a problem of the resource distribution.

Moreover, it is preferable that a transfer is equally carried out and an equal burst transfer is permitted regardless of the priority of the frame when an apparatus is not in a congestion state.

An object of the present invention is to provide a network communication apparatus which a band limitation is carried out to prevent the congestion of a transfer destination apparatus in addition to solving the above-mentioned problem.

The network communication apparatus according to the present invention includes an open flow processing section 21 which registers a flow entry defining a rule and an action to uniformly control a received frame as a flow on a flow table under a control by a controller, a bucket providing section which provides a shared bucket corresponding to all frames and a priority bucket corresponding to a priority of each of the frames destined to the controller, a shared bucket evaluating section 23 which evaluates whether or not the received frame is destined to the controller and evaluates the shared bucket for the frame destined to the controller, the priority bucket evaluating section 24 which evaluates the priority bucket corresponding to the priority of the frame to determine a transfer or a discard when a preferential band limitation of a transfer frame is carried out as a result of the evaluation of the shared bucket.

A method of a preferential band limitation of a transfer frame according to the present invention is executed by a network communication apparatus and includes: registering a flow entry defining a rule and an action for uniformly controlling a received frame as a flow, into a flow table under a control by a controller; providing a shared bucket for all of frames destined to said controller and a priority bucket for a priority of every frame; evaluating whether or not the received frame is destined to said controller and evaluating the shared bucket to the frame destined to said controller; and evaluating the priority bucket corresponding to the priority of the frame to determine a transfer or a discard when preferential band limitation of the a transfer frame is carried out as a result of the evaluation of the shared bucket.

A program according to the present invention is a program to make a network communication apparatus execute the processing of the above-mentioned method of a preferential band limitation of a transfer frame. It should be noted that the program according to the present invention can be stored in a storage unit and a non-transitory recording medium.

Because tokens of an amount determined based on the priority are supplemented to each bucket for every constant period Even when a large amount of frames of higher priorities arrives, transfer of frames to the buckets of lower priorities are never stopped. Also, because all of tokens left in each bucket are supplemented to the shared bucket regardless of the priority for every constant period, the even transfer of transfer frames can be carried out in the shared bucket. The frame is evaluated in arrival order to determine that the frame should be transferred or discarded, based on the use or non-use of the token. It is not necessary to provide a sub queue for every priority and the band limitation is possible at the same time.

DESCRIPTION OF THE EXEMPLARY EMBODIMENTS

The present invention targets a CD separation type network system. Here, an open flow (OpenFlow) network system as one of the CD separation type network system will be described as an example. However, actually, the present invention is not limited to the open flow network system.

Exemplary Embodiments

Exemplary embodiments will be described below with reference to the attached drawings.
(System Configuration)

Figure 1:
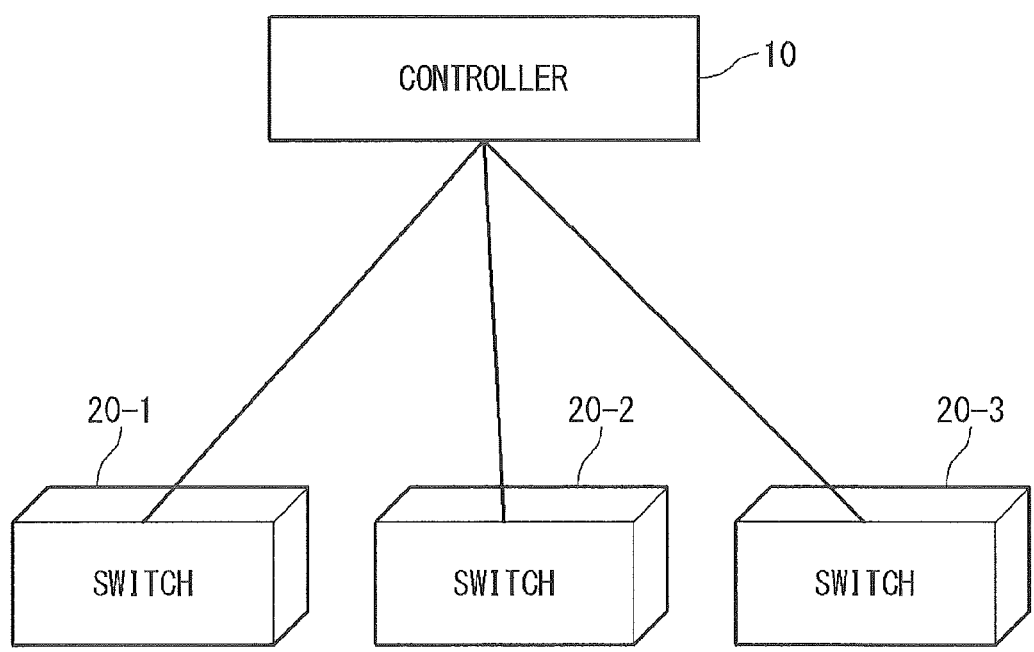
FIG. 1 is a diagram showing a configuration example of an open flow network system.

As shown in FIG. 1, the open flow network system includes a controller 10 and switches 20 (20-i, i=1 to n: n is optional).

The controller 10 is a server apparatus and assigns a priority to a received frame, for each of the switches 20 (20-i, i=1 to n). Here, the controller 10 adds a priority data to a flow entry in which a behavior of the received frame is defined to set to each of the switches 20 (20-i, i=1 to n).

Each of the switches 20 (20-i, i=1 to n) is a network communication unit and performs a preferential band limitation on the frame flowing into the controller 10 as a destination. Each of the switches 20 (20-i, i=1 to n) classifies the frames flowing into the controller 10 as the destination on the basis of a plurality of priorities defined.

Here, each of the switches 20 (20-i, i=1 to n) evaluates the frame in the flow table in which the flow entry has been registered, when the frame has been received. When the priority is assigned, each of the switches 20 (20-i, i=1 to n) carries out a transfer limitation of the received frame in accordance with the priority of the frame.

Note that among the switches 20 (20-i, i=1 to n), the switch that carries out transfer processing of the frame to the controller 10 may be only the switch corresponding to an input side edge switch. That is, the switch 20 that firstly receives the frame from outside the open flow network becomes a main target of the present invention. Of course, a switch corresponding to a core switch may be the target of the present invention because the switch can carry out the transfer processing of the frame to the controller 10.

The preferential band limitation in the present invention employs and attains a token bucket method.

In this exemplary embodiment, the switch 20, which is one of the switches 20 (20-i, i=1 to n) and receives a frame, provides one shared bucket (a common bucket without depending on any priority) and a plurality of priority buckets (the bucket for every priority) for the frame designated to the controller 10. Only evaluation of a token amount and buckets is assumed to be carried out in those buckets. Those buckets are not used as a matrix for the evaluation, and a buffer or queue which is used from reception to transmission. In this exemplary embodiment, the switch 20 takes out the frame from a reception buffer and checks whether or not a token exists in any of the buckets corresponding to the frame. If the token exists in any bucket, the switch 20 transfers the frame to a transmission buffer. If the token does not exist in any bucket, the frame is discarded. In the evaluation of the token or bucket, the frame is never buffered.

At first, when receiving the frame, the switch 20 evaluates whether or not the received frame is designated to the controller 10, and evaluates the shared bucket for the frame designated to the controller 10.

If a sufficient amount of tokens do not exist in the shared bucket, the switch 20 having received the frame evaluates the priority bucket corresponding to the priority of the frame to determine whether it should be transferred or discarded.
(Exemplification of Hardware)

An example of a specific hardware configuration to attain the controller 10 and each of the switches 20 (20-i, i=1 to n) according to the present invention will be described below.

As an example of the controller 10, a calculator such as a PC (personal computer), an appliance, a thin client server, a workstation, a mainframe, and a supercomputer is assumed. Note that the controller 10 is not limited to a terminal or a server, and may be a relaying unit or a peripheral unit. Also, the controller 10 may be an extension board provided in the calculator or the like, and a virtual machine (VM) built on a physical machine.

As an example of each of the switches 20 (20-i, i=1 to n), a network switch, a route, a proxy, a gateway, a firewall, a load balancer (load distributing apparatus), a band control apparatus (packet shaper), a security monitor control apparatus (SCADA: Supervisory Control And Data Acquisition), a gate keeper), a base station, an access point (AP), a communication satellite (CS), or a calculator that has a plurality of ports, or the like is considered.

The above controller 10 and each of the switches 20 (20-i, i=1 to n) are realized by using: a processor that executes a program to perform predetermined processing; a memory for storing the program and various data; and an interface used to communicate with a network.

As an example of the above processor, a CPU (Central Processing Unit), a network processor (NP), a microprocessor, a microcontroller, or a semiconductor integrated circuit (LSI: Large Scale Integration) that has a dedicated function) or the like is exemplified.

As an example of the above memory, a semiconductor storage device such as RAM (Random Access Memory), ROM (Read Only Memory), EEPROM (Electrically Erasable and Programmable Read Only Memory) and a flash memory, an auxiliary storage unit such as HDD (Hard Disk Drive) and SSD (Solid State Drive), a removal disk such as DVD (Digital Versatile Disk), and a storage media such as an SD memory Card (Secure Digital memory card) is exemplified. Also, this may be a buffer, a register or the like. Or, this may be a storage unit that uses DAS (Direct Attached Storage), FC-SAN (Fiber Channel-Storage Area Network), NAS (Network Attached Storage), IP-SAN (IP-Storage Area Network) or the like.

Note that the above processor and the above memory may be integrated onto a single chip. For example, one chip configuration of a micro-computer is advanced in recent years. Thus, an example is considered in which one chip microcomputer provided in electronic equipment or the like contains the processor and the memory.

As an example of the above interface a substrate (a mother board, an I/O board) corresponding to a network communication, a semiconductor integrated circuit such as a chip, as a network adaptor such as an NIC (Network Interface Card) and a similar extension card, a communication apparatus such as an antenna, or a communication port such as a connection port (connector) is exemplified.

Also, as an example of the network, Internet, LAN (Local Area Network), a wireless LAN, WAN (Wide Area Network), a back born, a cable television (CATV) line, a fixed telephone network, a mobile telephone network, WiMAX (IEEE 802.16a), 3G ($3^{rd}$ Generation), a Dedicated line (lease line), IrDA (Infrared Data Association), Bluetooth (Registered Trademark), a serial communication line, a data bus or the like is considered.

Note that configuration elements inside the controller 10 and each of the switches 20 (20-i, i=1 to n) may be modules, components, dedicated devices, or programs for starting (calling) them.

However, actually, the present invention is not limited to those examples.

(Preferential Band Limitation)

The preferential band limitation in the present invention will be described below in detail.

The switch 20, which is one of the switches 20 (20-i, i=1 to n) and receives the frame, uses two kinds of token buckets and carries out a band limitation evaluation and a priority evaluation of the received frame.

At first, when receiving the frame, the switch 20 provides a bucket corresponding to a priority of the frame.

The switch 20 having received the frame supplements tokens of an amount determined based on each priority, into the bucket provided for the priority of the frame Moreover, the switch 20 having received the frame provides one shared bucket prior to the evaluation of those buckets.

Figure 2:
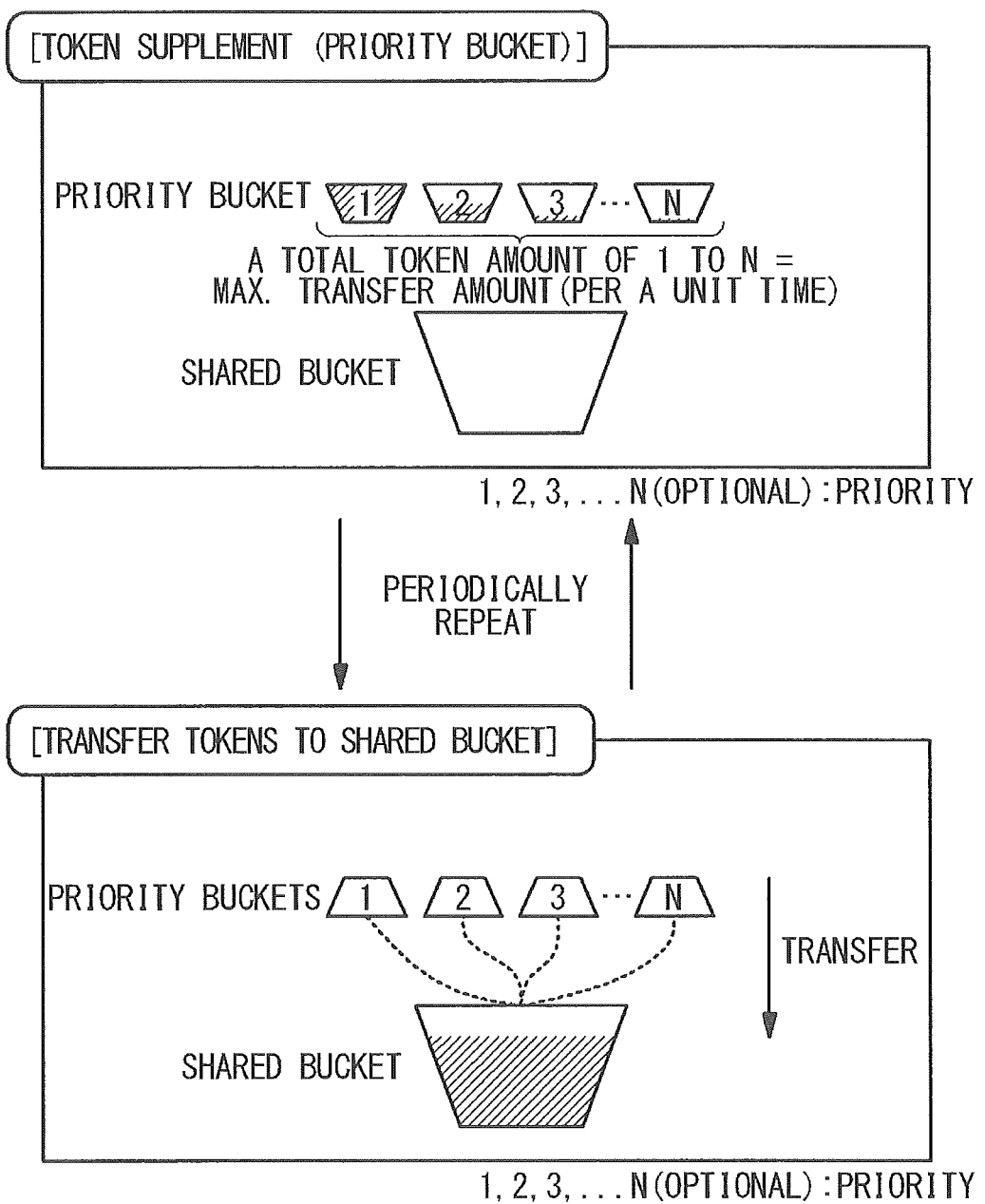
FIG. 2 is a conceptual diagram showing a preferential band limitation in the present invention.

As shown in FIG. 2, when receiving the frame, the switch 20 supplies all of the tokens, which exist in a bucket provided for every priority at that time, to the shared bucket for every constant period.

However, a depth (capacity) of the shared bucket is fixed to a burst transfer allowance amount of the apparatus. When the tokens overflow beyond a limit of the depth (capacity) of the shared bucket, the switch 20 having received the frame discards the overflowing tokens.

Figure 3:
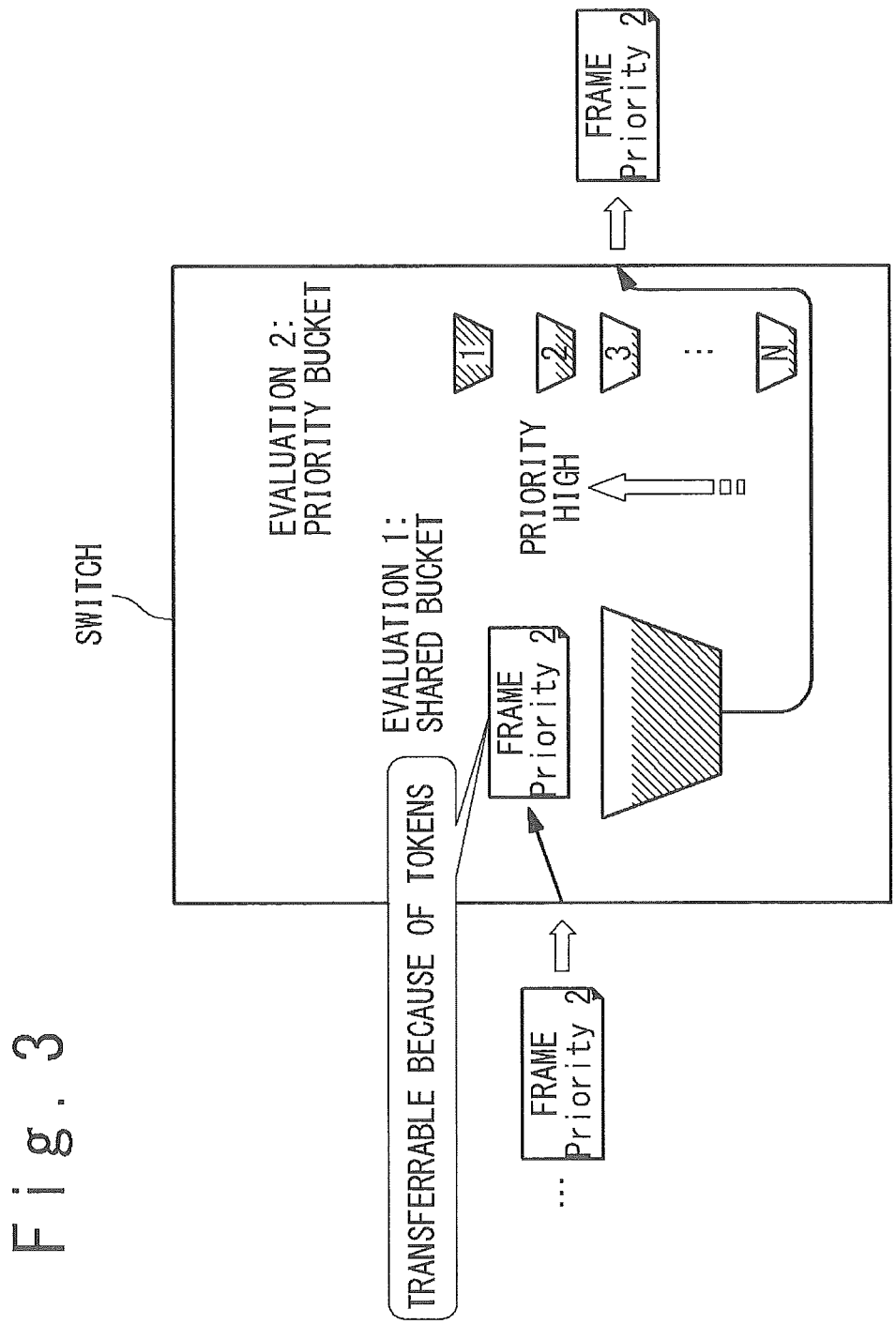
FIG. 3 is a diagram showing an example that a token exists in a shared bucket.

As shown in FIG. 3, the switch 20 having received the frame equally evaluates and transfers all of frames, irrespectively of the priorities of the frames, as long as the tokens exist in the shared bucket.

If no token exist in the shared bucket, the switch 20 having received the frame switches to a preferential band limitation of a later stage to evaluate the bucket provided for every priority.

Figure 4:
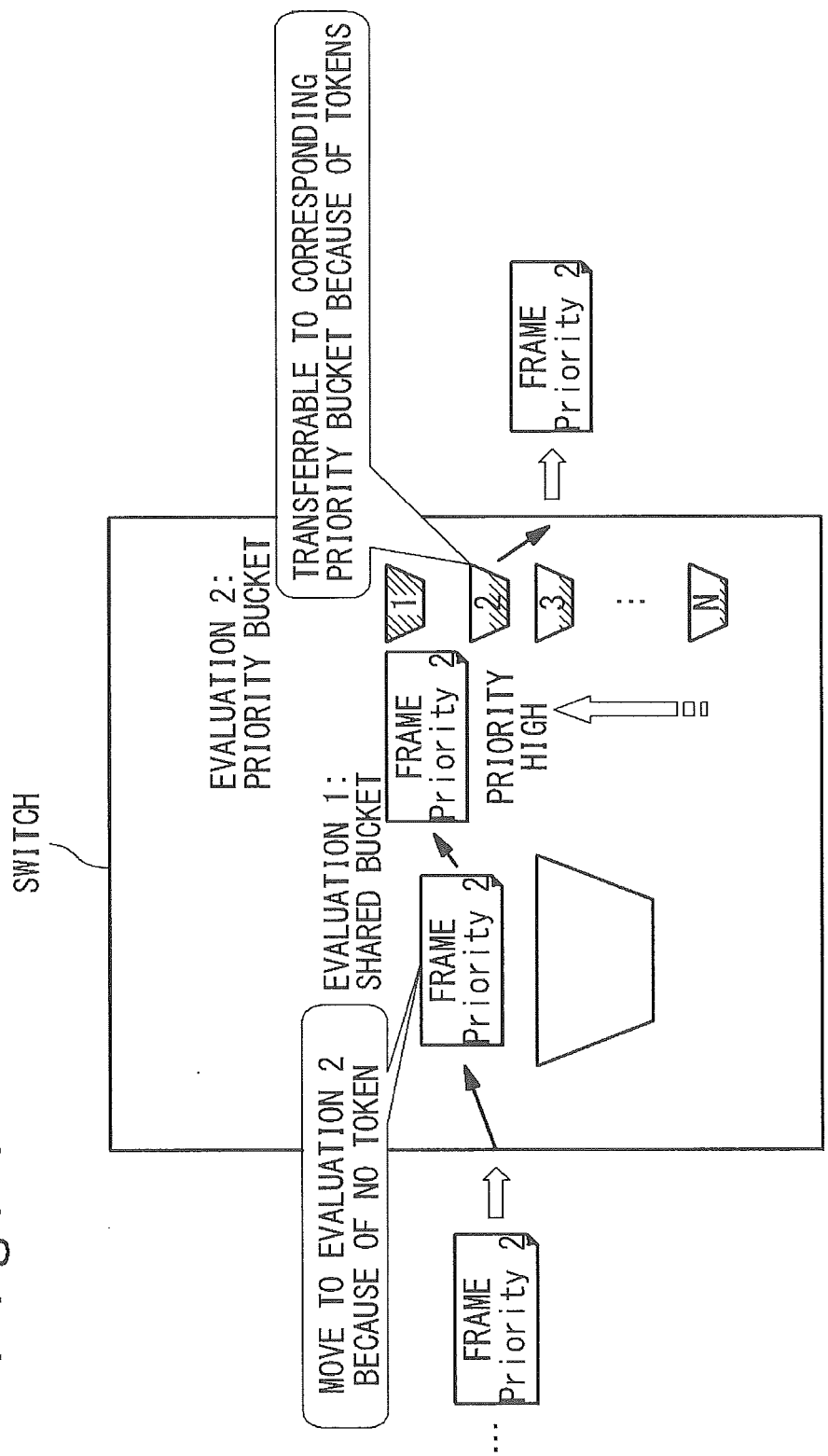
FIG. 4 is a diagram showing an example that the token exists in a priority bucket.

As shown in FIG. 4, when switching to the preferential limitation, the switch 20 having received the frame checks a priority bucket corresponding to a priority determined at the time of flow identification for each of the frames, and carries out transfer processing if a token exists in the priority bucket corresponding to the priority.

Figure 5:
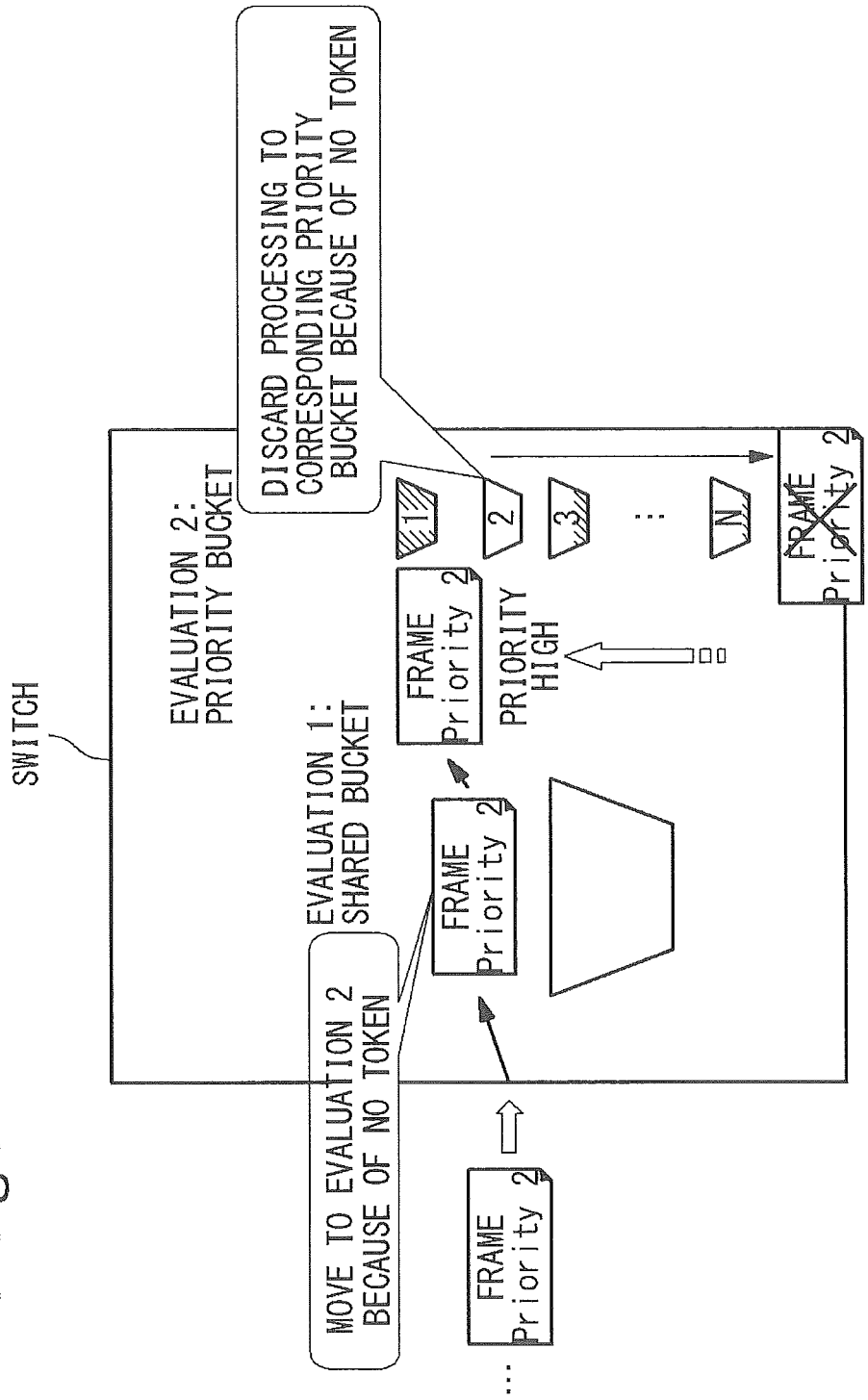
FIG. 5 is a diagram showing an example that the token does not exist in both of the buckets.

As shown in FIG. 5, the switch 20 having received the frame carries out discard processing of the frame, if a token does not exist in the priority bucket.

Note that the switch 20 having received the frame supplements tokens of an amount determined based on the priority for every constant time for every priority bucket, even if a large amount of frames of high priorities arrive. For this reason, the amount of tokens are supplemented for every constant time in all of the priority buckets, so that there is no case that the frame does not enter in a non-transfer state even in the buckets of low priorities.

Also, the switch 20 having received the frame supplements all of tokens in the priority buckets into the shared bucket, irrespectively of the priority of the frame, after a constant period. For this reason, some tokens exist in the shared bucket for every constant period, so that all of the frames can be equally evaluated and transferred irrespectively of the priorities of the frames.

The switch 20 having received the frame evaluates the frames in the order of arrival of the frames to determine whether the frame should be transferred or discarded, on the basis of whether the token is used.

The switch 20 having received the frame is not required to provide a sub queue for every priority and can carry out the band limitation at the same time.

(Switch Operation)

Figure 6:
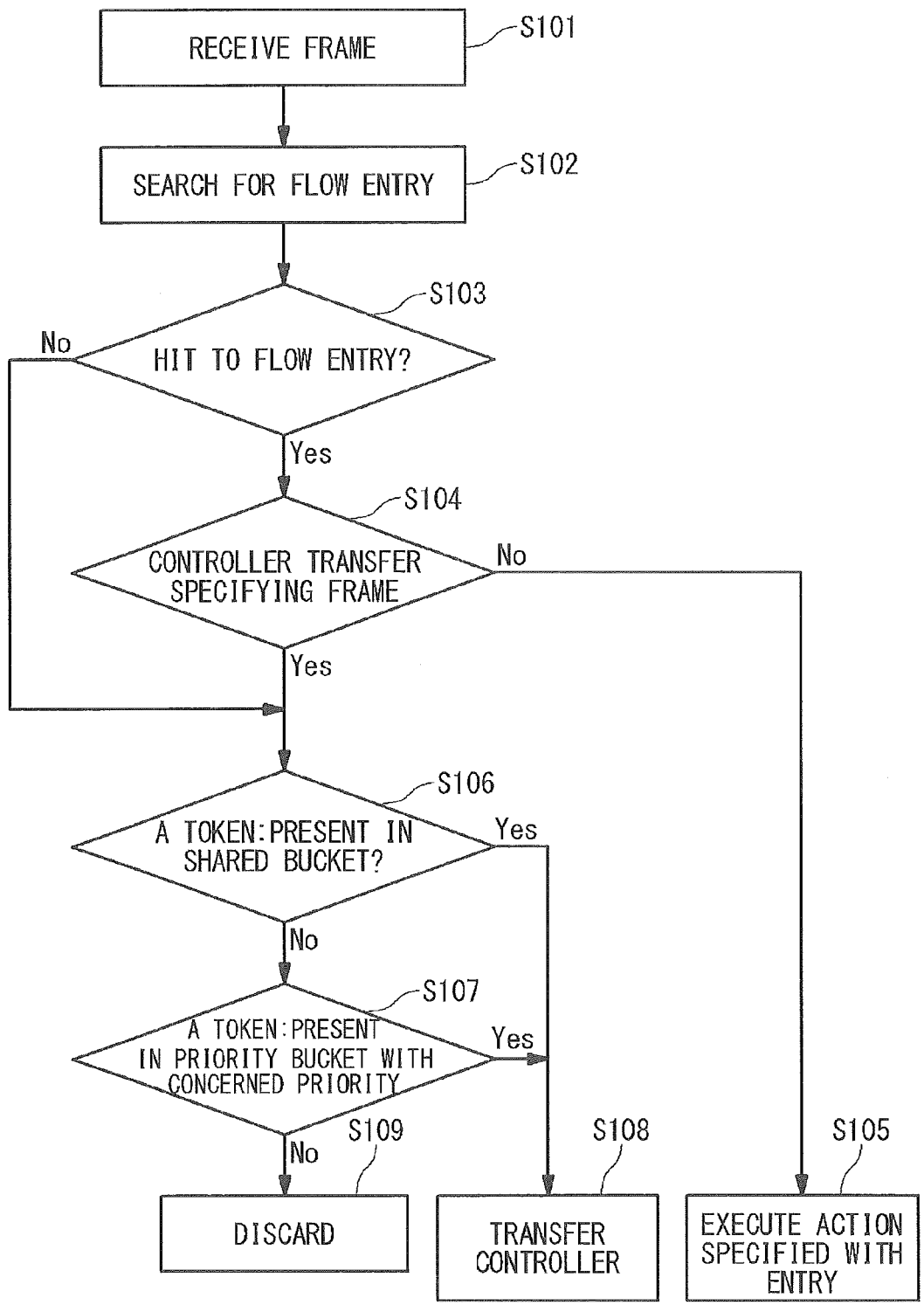
FIG. 6 is a flowchart showing an operation of a switch (network communication apparatus) according to the present invention.

The operation of the switch in the present invention will be described below with reference to FIG. 6.

(1) Step S101

Of the switches 20 (20-i, i=1 to n), any switch receives an arrived frame.

(2) Step S102

The switch 20 having received the frame searches the flow table by using the frame. That is, the switch 20 having received the frame searches the flow table for the frame.

(3) Step S103

The switch 20 having received the frame checks whether or not the frame hits a flow entry.

(4) Step S104

If the frame hits a flow entry (Yes at Step S103), the switch 20 having received the frame checks whether or not an action of the flow entry indicates a transfer to the controller 10.

(5) Step S105

If the action of the flow entry is an action other than the transfer to the controller 10 although the frame hits the flow entry (No at Step S104), the switch 20 having received the frame carries out frame processing according to the action. Therefore, this case is not included in the operation of the present invention. That is, the frame processing in the ordinary open flow network system is carried out.

Also, if the processing peculiar to the open flow is carried out to notify the controller 10 of the search result that the frame does not hit any flow entry and is an unknown frame (No at Step S103), the switch 20 having received the frame carries out processing of the frame destined to the controller 10. This operation is included in the operation of the present invention, and evaluation of the shared bucket and the priority buckets is carried out.

Also, if the frame hits the flow entry, and further the action of the flow entry indicates the transfer to the controller 10 (Yes at Step S104), the switch 20 having received the frame similarly evaluates the shared bucket and the priority buckets, which is included in the operation of the present invention.

(6) Step S106

The switch 20 having received the frame measures an amount of tokens in the shared bucket and checks whether or not the token exists in the shared bucket, when the switch 20 carries out the processing peculiar to the open flow to notify the controller 10 of the search result that the frame does not hit any flow entry and is an unknown frame because (No at Step S103), or when the frame hits a flow entry and an action of the flow entry indicates a transfer destined to the controller 10 (Yes at Step S104).

(7) Step S107

If any token does not exist in the shared bucket (No at Step S106), the switch 20 having received the frame checks whether or not any token exists in the bucket provided for every priority.

(8) Step S108

The switch 20 having received the frame transfers the frame destined to the controller 10, when a token exists in the shared bucket (Yes at Step S106), or when any token does not exist in the shared bucket and a token exists in the priority bucket for the frame (Yes, at Step S107).

Figure 7:
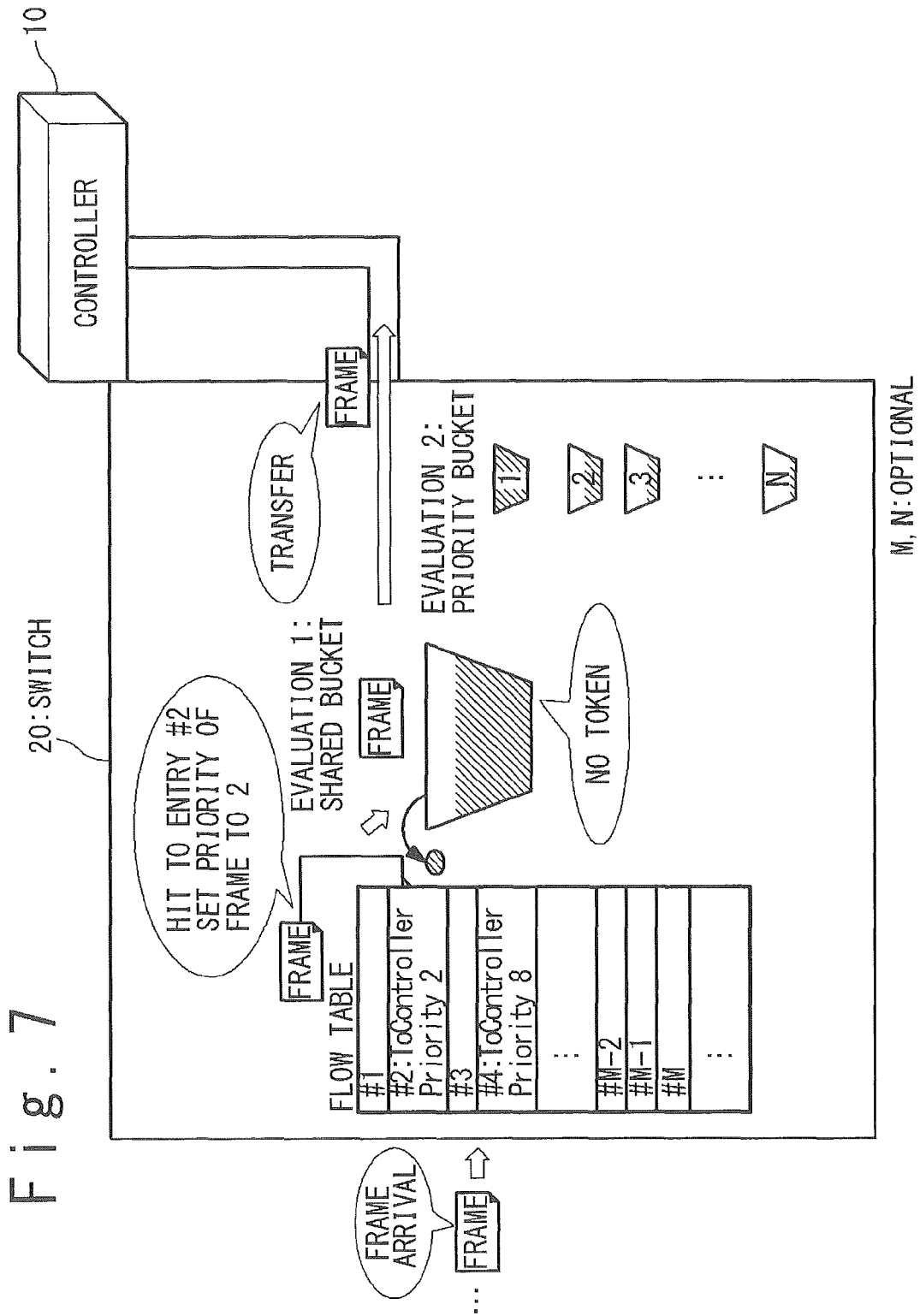
FIG. 7 is a diagram showing frame processing when the token exists in the shared bucket.

At this time, as shown in FIG. 7, when the token exists in the shared bucket, the switch 20 having received the frame carries out subtract processing the token(s) corresponding to an amount of transferred frame(s) from the shared bucket.

Figure 8:
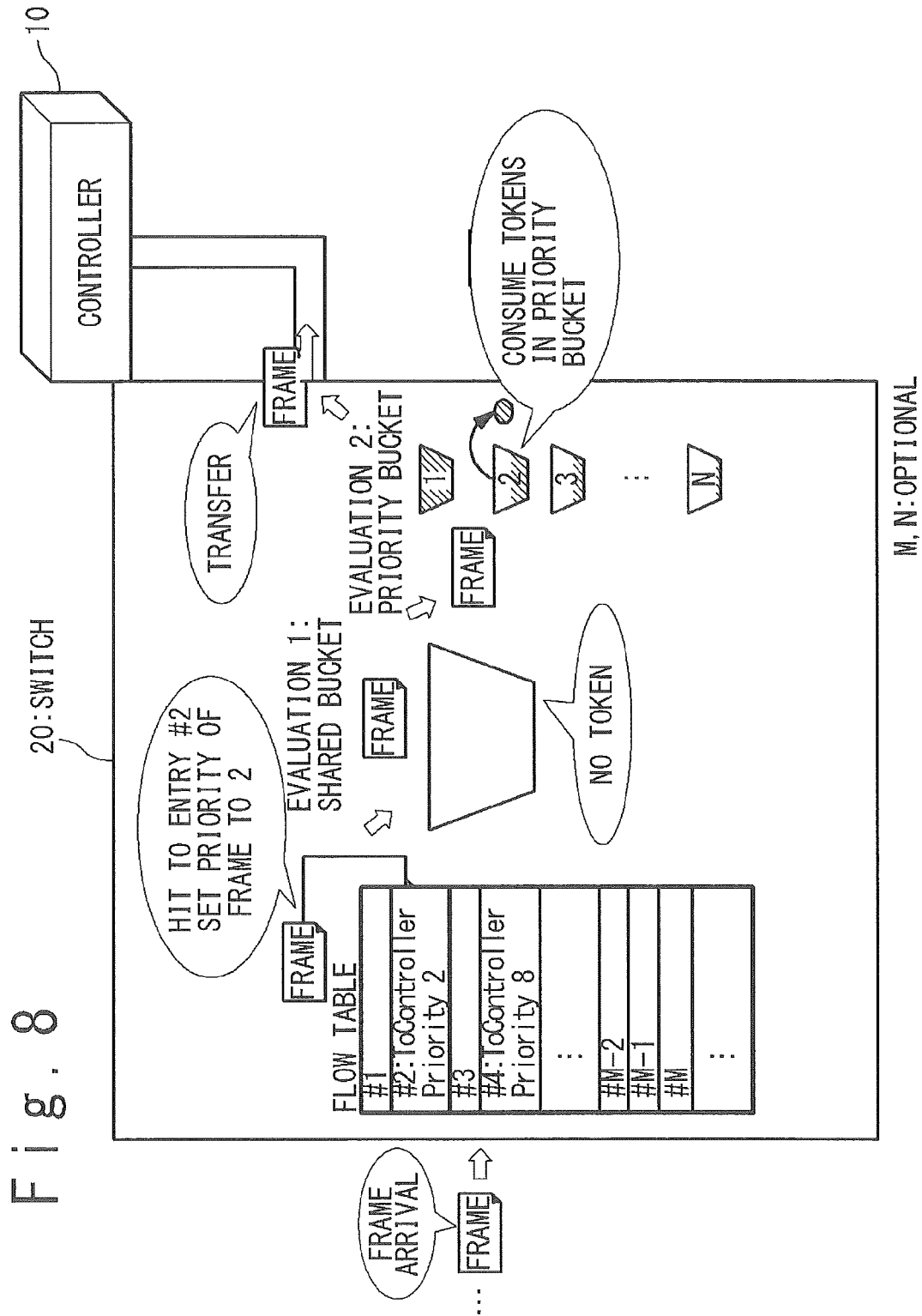
FIG. 8 is a diagram showing the frame processing when the token exists in the priority bucket.

Also, as shown in FIG. 8, when a token exist in the priority bucket corresponding to the frame, the switch 20 having received the frame carries out subtract processing of the token(s) corresponding to an amount of the transferred frame(s) from the priority bucket.

(9) Step S109

The switch 20 having received the frame carries out discard processing of the frame, if any token does not exist in the shared bucket and also any token does not exist in the priority bucket of the frame (No at Step S107).

Figure 9:
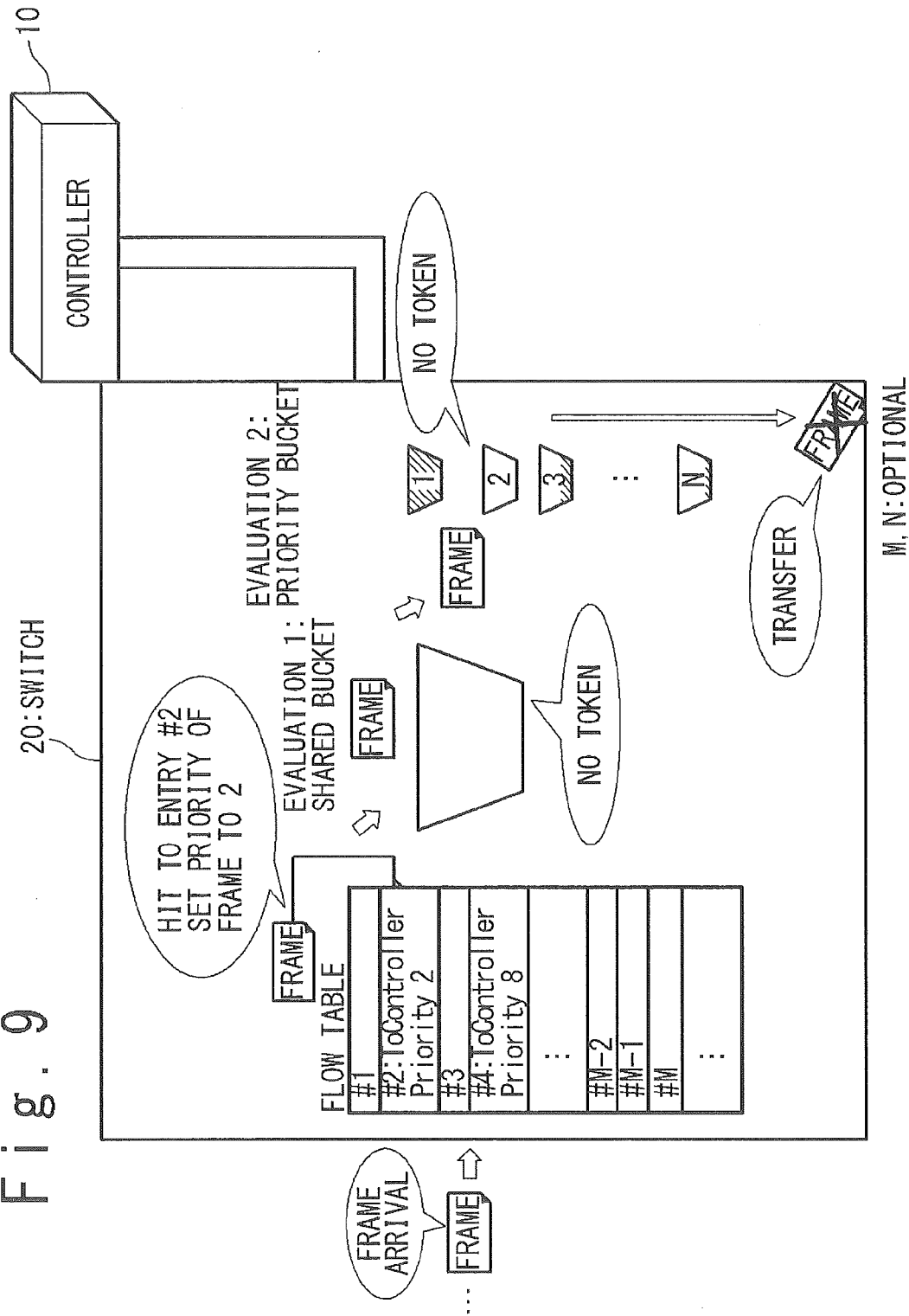
FIG. 9 is a diagram showing the frame processing when the token does not exist in both of the buckets.

That is, as shown in FIG. 9, the switch 20 having received the frame carries out the discard processing of the frame, if any token is not reserved in the evaluation of both of the shared bucket and the priority bucket.

The switch 20 having received the frame supplements tokens of an amount weighted or determined in accordance with each priority, into the priority bucket for each constant time.

That is, the supplemented amount of the tokens is different for every priority bucket.

At this time, a total amount of tokens supplemented in the priority bucket is equal to the maximum transfer amount that can be transferred to the controller 10 by the switch 20 having received the frame.

After the supplement of the tokens into the priority bucket, the switch 20 having received the frame assigns all of the tokens in all of the priority buckets to the shared bucket with no condition for every constant time, and consequently supplements the tokens into the shared bucket.

However, the depth (capacity) of the shared bucket is equal to the maximum burst transfer amount. Therefore, the switch 20 having received the frame does not supplement the tokens of the depth (capacity) or more into the shared bucket, and discards the excessive tokens.

The switch 20 having received the frame supplements tokens of an amount weighted again, into an empty priority bucket, after a predetermined time.

That is, the switch 20 having received the frame supplements tokens into the priority bucket, after all of the priority buckets become empty. The switch 20 having received the frame manages and periodically repeats timing when the priority bucket becomes empty and timing when the token of the predetermined amount is supplemented.

However, as shown in FIG. 2, with regard to the supplement into the shared bucket, the shared bucket is not required to be empty.

(Effect)

In the present invention, the maximum amount of the supplement into the priority bucket regarded as the final evaluation is defined as the maximum transfer amount of the apparatus. Thus, there is no case that exceeds the maximum transfer amount at any time point because of the operation of making all of the priority buckets empty once prior to the supplement. For this reason, not the band control such as QoS, the control based on processing performance and the control of prevention of exceeding an allowable reception range of a transfer destination apparatus can be performed.

Also, from the viewpoint of the priority control, an effect similar to WFQ is expected. Moreover, simultaneously with the above effect, it is possible to realize the characteristic effect of the token bucket method in which the tokens of the priority buckets are periodically collected into the shared bucket and the burst transfers can be evenly allowed irrespectively of a frame kind in the range of the shared bucket.

Note that the conventional token bucket method is not used for the band limitation and the priority control and is used to measure a band amount.

On the other hand, the present invention attains the preferential band limitation by applying the token bucket method and providing the bucket for every priority. For this reason, in the priority bucket, tokens are supplemented into all of the buckets. Therefore, the band guarantee of all of the priorities can be realized, and the band can be guaranteed even with regard to the frame of a low priority.

Moreover, in the present invention, because a buffer for storing the frame for every priority is not required to be provided in the priority class classification of the frame, unlike the conventional priority control method, a memory resource can be saved and the implementation is easy.

<Supplemental Note>

Each of the switches 20 (20-i, i=1 to n) according to the present invention can be also described as shown in the following supplemental notes. However, the present invention is not limited to the following description examples. Here, for the sake of the simple description, each of the switches 20 (20-i, i=1 to n) is represented as "Switch 20".

<Supplemental Note 1>

A basic configuration example of the switch 20 according to the present invention will be described below with reference to FIG. 10.

The switch 20 according to the present invention contains an open flow processing section 21, a bucket setting section 22, a shared bucket evaluating section 23 and a priority bucket evaluating section 24.

The open flow processing section 21 registers the flow entry in which a rule and an action are defined to uniformly control the received frames as a flow, in the flow table in accordance with the control by the controller 10.

The bucket setting section 22 provides a shared bucket corresponding to all of the frames; and a priority bucket corresponding to a priority of each frame, for the frames destined to the controller 10.

The shared bucket evaluating section 23 evaluates whether or not the received frame is destined to the controller 10 and evaluates the shared bucket, for the frames destined to the controller 10.

If the preferential band limitation of the transfer frame is carried out as the result of the evaluation of the shared bucket, the priority bucket evaluating section 24 evaluates the priority bucket corresponding to the priority of each frame and determines whether the frame should be transferred or discarded.

<Supplemental Note 2>

Figure 11:
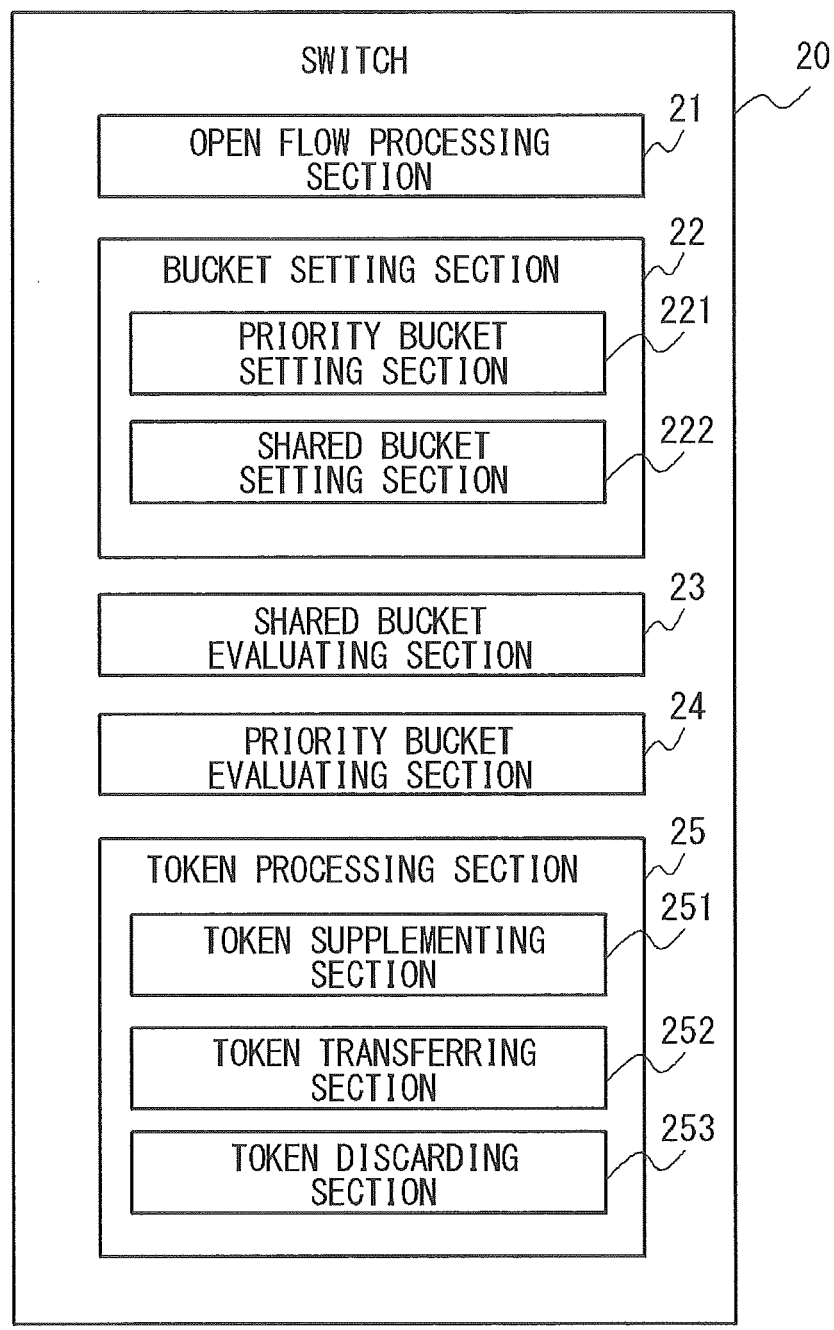
FIG. 11 is a diagram showing a detailed configuration example of the switch (network communication apparatus) according to the present invention.

A detailed configuration example of the switch 20 according to the present invention will be described with reference to FIG. 11.

Figure 10:
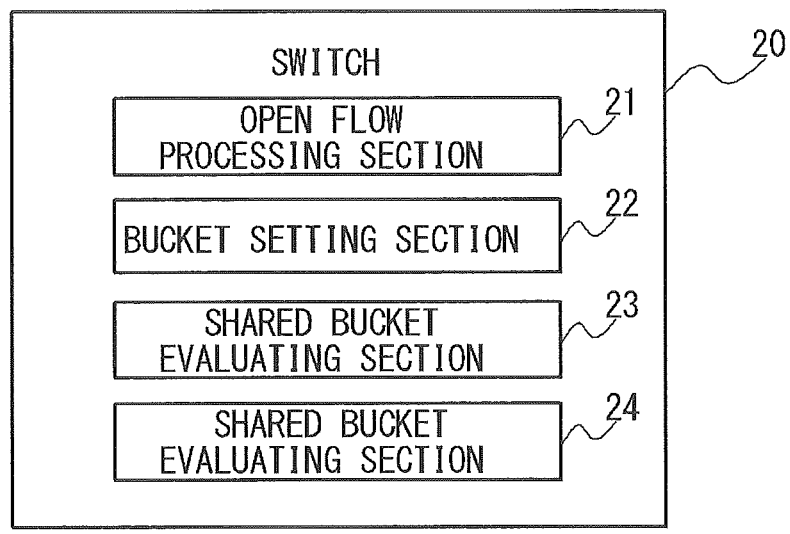
FIG. 10 is a diagram showing a basic configuration example of a switch (network communication apparatus) according to the present invention.

Note that the explanation of contents common to those shown in FIG. 10 is omitted.

The bucket setting section 22 contains a priority bucket setting section 211 and a shared bucket setting section 222.

A priority bucket setting section 221 provides the bucket for every priority of the received frame.

The shared bucket setting section 222 provides one shared bucket, prior to the evaluation of the priority bucket provided for every priority.

The switch 20 according to the present invention further contains a token processing section 25.

The token processing section 25 contains a token supplementing section 251, a token transferring section 252 and a token discarding section 253.

The token supplementing section 251 supplements the tokens of an amount determined based on the priority, into the bucket provided for every priority.

The token transferring section 252 supplies all of the tokens, which exist in the bucket provided for every priority at that time, to the shared bucket for every constant period.

If the tokens exceeds a capacity of the shared bucket and overflows from it, the token discarding section 253 discards the overflowing tokens.

As long as the token exists in the shared bucket, the shared bucket evaluating section 23 equally evaluates and transfers all of the frames, irrespectively of the priority of the received frame.

If any token does not exist in the shared bucket, the priority bucket evaluating section 24 switches to the preferential band limitation and evaluates the bucket provided for every priority and then checks whether or not a token exists in the bucket corresponding to the priority of the received frame. The priority bucket evaluating section 24 carries out the transfer processing for the received frame, if the token exists in the priority bucket corresponding to the priority of the received frame, as the checked result. Also, the priority bucket evaluating section 24 carries out the discard processing for the received frame, if any token does not exist in the bucket corresponding to the priority of the received frame.

<Supplemental Note 3>

The foregoing configuration will be described below in further detail, with reference to FIG. 10 and FIG. 11.

The open flow processing section 21 searches the flow table based on the arrived frame to determine whether or not the frame hits the flow entry. The open flow processing section 21 checks whether or not the action of the flow entry indicates a transfer destined to the controller 10, if the frame hits the flow entry. If the action of the flow entry is an action except for the transfer destined to the controller 10, the open flow processing section 21 carries out the frame processing in accordance with the action.

The shared bucket evaluating section 23 measures an amount of tokens in the shared bucket and checks whether or not any token exists in the shared bucket, if notification processing is carried out to the controller 10 of that the frame does not hit the flow entry and is an unknown frame, or if the frame hits the flow entry and the action of the flow entry indicates the transfer destined to the controller 10.

The priority bucket evaluating section 24 checks whether or not any token exists in the bucket provided for every priority, if any token does not exist in the shared bucket.

The open flow processing section 21 transfers the frame destined to the controller 10, if the token exists in the shared bucket, or if the token does not exist in the shared bucket but the token exists in the priority bucket of the frame.

If the token exists in the shared bucket, the shared bucket evaluating section 23 carries out the subtract processing of the token(s) corresponding to an amount of the transferred frame(s) from the shared bucket.

If the token exists in the priority bucket of the frame, the priority bucket evaluating section 24 carries out the subtracting processing of the token(s) corresponding to the amount of the transferred frame(s) from the priority bucket.

The open flow processing section 21 carries out the discarding processing of the frame, if the token does not exist in the shared bucket and also the token does not exist in the priority bucket of the frame <Supplemental Note 4>

Note that the above configuration is realized by using the processor that is driven on the basis of a program to execute the predetermined processing; the memory for storing the program and various data; and the interface used to communicate with the network.

<Remark>

As mentioned above, the exemplary embodiments of the present invention have been described in detail. Actually, the present invention is not limited to the above-mentioned exemplary embodiments. Thus, a modification in a range without departing from the spirit and scope of the present invention is included in the present invention.

Note that this patent application claims a priority based on Japanese patent application No. JP 2011-250191, and the disclosure thereof is incorporated herein by reference.

The invention claimed is:

1. A network communication apparatus comprising:
   an interface; and
   a processor connected to said interface,
   wherein said processor is configured to:
   register in a flow table, a flow entry in which a rule and an action are defined to uniformly control a received frame as part of a flow, based on a control by a controller which controls the network communication apparatus;
   provide a shared bucket for all frames destined to said controller and a priority bucket corresponding to a priority for every frame destined to said controller;
   evaluate whether or not the received frame is destined to said controller, and evaluate the shared bucket to the frame destined to said controller;
   evaluate the priority bucket corresponding to the priority of the frame to determine a transfer or a discard when a preferential band limitation of the transfer frame is performed as an evaluation result of the shared bucket;
   provide the priority bucket for every priority of the received frame;
   supplement tokens of an amount determined based on the priority into the priority bucket provided for every priority;

provide the shared bucket prior to the evaluation of the priority bucket provided for every priority;
transfer all tokens which exist in the priority bucket provided at a time point for every priority to the shared bucket for every period; and
discard overflowing tokens when the tokens exceed a capacity of the shared bucket,
wherein the processor is further configured to evaluate and transfer all of the frames evenly irrespective of the priority of the received frame, as long as tokens are not present in the shared bucket, and
wherein the processor is further configured to:
switch to preferential band limitation when a token does not exist in the shared bucket, to evaluate a priority bucket provided for every priority, and check whether a token exists in the priority bucket corresponding to the received frames;
perform transfer processing of the received frame when the token exists in the priority bucket corresponding to the priority of the received frame; and
carry out discard processing of the received frame when a token does not exist in the priority bucket corresponding to the priority of the received frame.

2. The network communication apparatus according to claim 1, wherein said processor is further configured to:
search said flow table based on an arrived frame;
check whether or not the frame hits a flow entry;
check whether or not an action of the flow entry is a transfer destined to said controller when the frame hits the flow entry; and
carry out processing of the frame based on the action when the action of the flow entry is an action except for the transfer destined to said controller,
wherein said shared bucket evaluating section is further configured to measure a token amount in the shared bucket to determine whether or not a token exists in the shared bucket, when the frame does not hit any flow entry and the processing is carried out to notify said controller of the search result that the frame is an unknown frame, or when the frame hits a flow entry and an action of the flow entry is a transfer destined to said controller,
wherein said priority bucket evaluating section is further configured to check whether or not a token exists in the priority bucket provided for every priority when any token does not exist in the shared bucket,
wherein said open flow processing section is further configured to carry out the transfer of the frame to said controller when the token exists in the shared bucket or when any token does not exist in the shared bucket and the token exists in the priority bucket with the frame,
wherein said shared bucket evaluating section is further configured to subtract the tokens corresponding to an amount of the transferred frame from the shared bucket when the token exists in the shared bucket,
wherein said priority bucket evaluating section is further configured to subtract the tokens corresponding to an amount of the transferred frame from the priority bucket when the token exists in the priority bucket of the frame, and
wherein said open flow processing section is further configured to discard the frame when the token does not exist in the shared bucket and the token does not exist in the priority bucket of the concerned frame.

3. A method of carrying out a preferential band limitation of a transfer frame by a network communication apparatus, comprising:
registering a flow entry defining a rule and an action for uniformly controlling a received frame as a flow, into a flow table under a control by a controller which controls the network communication apparatus;
providing a shared bucket for all of frames destined to said controller and a priority bucket for a priority of every frame destined to the controller;
evaluating whether or not the received frame is destined to said controller and evaluating the shared bucket to the frame destined to said controller;
evaluating the priority bucket corresponding to the priority of the frame to determine a transfer or a discard when preferential band limitation of the transfer frame is carried out as a result of the evaluation of the shared bucket;
providing a bucket for every priority of the received frame;
supplementing tokens of an amount determined based on a priority of the priority bucket provided for every priority;
providing one shared bucket before evaluation of the priority bucket provided for every priority;
transferring all the tokens which exist in the priority bucket provided for every priority at a time point to the shared bucket for every constant period;
discarding overflowing tokens when the tokens overflow beyond a capacity of the shared bucket;
equally evaluating and transferring all of the frames regardless of the priorities of the received frames as far as the tokens exist in the shared bucket;
switching to the preferential band limitation when a token does not exist in the shared bucket, and evaluating the priority bucket provided for every priority, to confirm whether or not a token exists in the priority bucket corresponding to the priority of the received frame;
carrying out transfer processing of the received frame when the token exists in the bucket corresponding to the priority of the received frame; and
carrying out discard processing of the received frame when the token did not exist in the bucket corresponding to the priority of the received frame.

4. The method of preferential band limitation of a transfer frame according to claim 3, further comprising:
searching the flow table based on the arrived frame;
checking whether or not the frame hit a flow entry;
checking whether or not an action of the flow entry is a transfer to said controller when the frame hits the flow entry;
carrying out frame processing based on the action when the action of the flow entry is an action except for the transfer to said controller;
measuring an amount of the tokens in the shared bucket to determine whether or not the token exists in the shared bucket, when the frame does not hit any flow entry and processing is carried out to notify said controller of the search result that the frame is unknown frame, or when the frame hits the flow entry and the action of the flow entry is a transfer destined to said controller;
checking whether or not the token exists in the priority bucket provided for every priority when the token does not exist in the shared bucket;
carrying out a transfer of the frame to said controller when a token exists in the shared bucket or when any token does not exist in the shared bucket and a token exists in the priority bucket of the frame;

subtracting tokens corresponding to an amount of the transferred frame from the shared bucket when the token exists in the shared bucket;

subtracting the tokens corresponding to the amount of the transferred frame from the priority bucket when the token exists in the priority bucket of the frame;

carrying out discard processing of the frame when the token does not exist in the shared bucket and the token does not exist in the priority bucket of the frame.

5. A non-transitory recording medium in which a program is stored to make a network communication apparatus execute:

registering a flow entry defining a rule and an action to uniformly control a received frame as a flow on a flow table under a control by a controller which controls the network communication apparatus;

providing a shared bucket for all frames destined to the controller and a priority bucket corresponding to a priority for every frame destined to said controller;

evaluating whether or not the received frame is destined to said controller, and evaluating the shared bucket to the frame destined to said controller; and evaluating the priority bucket corresponding to the priority of the frame to determine a transfer or a discard when preferential band limitation of a transfer frame is carried out as a result of the evaluation of the shared bucket;

providing a bucket for every priority of the received frame;

supplementing the tokens of an amount determined based on the priority in the bucket provided for every priority;

providing the shared bucket, which is a singular, before evaluation of the bucket provided for every priority;

transferring all the tokens which exist in the bucket provided for every priority to the shared bucket at the time point for every constant period;

discarding the overflowing tokens when the tokens overflow beyond a capacity of the shared bucket;

equally evaluating and transferring all of the frames regardless of the priority of each of the received frames as far as the tokens exists in the shared bucket;

switching to the preferential band limitation when the token does not exist in the the shared bucket, and evaluating the bucket provided for every priority to check whether or not the token exists in the bucket corresponding to the priority of the received frame;

carrying out transfer processing of the received frame when the token exists in the bucket corresponding to the priority of the received frame; and carrying out discard processing of the received frame when the token does not exist in the bucket corresponding to the priority of the received frame.

6. The non-transitory recording medium according to claim 5, wherein the program makes the network communication apparatus further execute:

searching the flow table based on an arriving frame;

checking whether or not the frame hits a flow entry;

checking whether or not an action of the flow entry is a transfer to the controller when the frame hits the flow entry;

carrying out frame processing according to the action when the action of the flow entry is an action except for the transfer to the controller;

measuring an amount of the tokens in the shared bucket to check whether or not the token exists in the shared bucket, when the frame does not hit any flow entry and processing is carried out which notifies of the controller that the frame is an unknown frame, or when the frame hits the flow entry and the action of the flow entry is a transfer to the controller;

checking whether or not the token exists in the bucket provided for every priority when the token does not exist in the shared bucket;

carrying out a transfer of the frame to the controller when the token exists in the shared bucket or when the token does not exist in the shared bucket and the token exists in the priority bucket of the frame;

subtracting the tokens corresponding to an amount of the transferred frames from the shared bucket when the token exists in the shared bucket;

subtracting the token corresponding to the amount of the transferred frames from the priority bucket when the token exists in the priority bucket of the frame; and carrying out discard processing of the frame when the token does not exist in the shared bucket and the token does not exist in the priority bucket of the frame.

7. A network communication apparatus comprising:

an interface; and a processor connected to said interface, wherein said processor is configured to:

register in a flow table, a flow entry in which a rule and an action are defined to uniformly control a received frame as part of a flow, based on a control by a controller which controls the network communication apparatus;

provide a shared bucket for all frames destined to said controller and a priority bucket corresponding to a priority for every frame destined to said controller;

evaluate whether or not the received frame is destined to said controller, and evaluate the shared bucket to the frame destined to said controller;

evaluate the priority bucket corresponding to the priority of the frame to determine a transfer or a discard when a preferential band limitation of the transfer frame is performed as an evaluation result of the shared bucket;

supplement tokens of an amount determined based on the priority into the priority bucket provided for every priority;

transfer all tokens which exist in the priority bucket provided at a time point for every priority to the shared bucket for every period;

discard overflowing tokens when the tokens exceed a capacity of the shared bucket;

evaluate and transfer all of the frames evenly irrespectively of the priority of the received frame, as long as any tokens are not present in the shared bucket;

switch to preferential band limitation when any token does not exist in the shared bucket, to evaluate a priority bucket provided for every priority, and checking whether a token exists in the priority bucket corresponding to the priority of the received frames;

perform transfer processing of the received frame when the token exists in the priority bucket corresponding to the priority of the received frame; and carry out discard processing of the received frame when any token does not exist in the priority bucket corresponding to the priority of the received frame.

* * * * *